(12) United States Patent
Bernard et al.

(10) Patent No.: US 10,055,932 B2
(45) Date of Patent: *Aug. 21, 2018

(54) DEVICE AND METHOD FOR ARRANGING VIDEO DISPLAYS TO DEFINE AN OPENING TO PASS A PHYSICAL OBJECT AND DISPLAY CONTENT ABOUT THE OPENING

(71) Applicant: Bally Gaming, Inc., Las Vegas, NV (US)

(72) Inventors: Vernon Bernard, Las Vegas, NV (US); Karl Wudtke, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,736

(22) Filed: Apr. 10, 2017

(65) Prior Publication Data

US 2017/0228970 A1     Aug. 10, 2017

Related U.S. Application Data

(63) Continuation of application No. 13/401,346, filed on Feb. 21, 2012, now Pat. No. 9,652,928.

(60) Provisional application No. 61/523,123, filed on Aug. 12, 2011.

(51) Int. Cl.
| | |
|---|---|
| G07F 17/32 | (2006.01) |
| A63F 13/26 | (2014.01) |
| G07F 17/34 | (2006.01) |
| A63F 13/90 | (2014.01) |

(52) U.S. Cl.
CPC .......... *G07F 17/3211* (2013.01); *A63F 13/26* (2014.09); *A63F 13/90* (2014.09); *G07F 17/3209* (2013.01); *G07F 17/3213* (2013.01); *G07F 17/34* (2013.01)

(58) Field of Classification Search
CPC ....... A63F 13/26; A63F 13/90; G07F 17/3211
See application file for complete search history.

(56) References Cited

U.S. PATENT DOCUMENTS

| | | | | |
|---|---|---|---|---|
| 5,038,142 A | * | 8/1991 | Flower ................. | G06F 3/0414 341/34 |
| 6,056,642 A | * | 5/2000 | Bennett ............... | G07F 17/3211 273/143 R |
| 6,811,273 B2 | * | 11/2004 | Satoh .................. | G07F 17/3211 362/23.08 |
| 6,817,946 B2 | * | 11/2004 | Motegi ............... | G07F 17/3211 273/138.1 |
| 6,893,345 B2 | * | 5/2005 | Motegi .................. | A63F 13/08 463/31 |
| 6,896,260 B2 | * | 5/2005 | Pierce .................... | G07F 17/32 273/138.2 |
| 7,281,980 B2 | * | 10/2007 | Okada ................. | G07F 17/3209 273/138.2 |

(Continued)

*Primary Examiner* — David Duffy
(74) *Attorney, Agent, or Firm* — Philip J. Anderson

(57) ABSTRACT

A device and method are set forth which includes an electronic, video display including L-shaped sub-displays mated to define a frame surrounding an opening which accommodates a physical object such as the view of a second display. The second display may be a mechanical component extending through the opening to operate for example a pointer operating with the video display to provide a function for a game. The opening may also be configured to reveal a mechanical, electro-mechanical or video display.

12 Claims, 9 Drawing Sheets

(56) References Cited

U.S. PATENT DOCUMENTS

| | | | | |
|---|---|---|---|---|
| 7,335,101 B1* | 2/2008 | Luciano, Jr. | ........ | G07F 17/3211 463/16 |
| 2003/0157980 A1* | 8/2003 | Loose | ................ | G07F 17/3202 463/20 |
| 2004/0062025 A1* | 4/2004 | Satoh | ................ | G07F 17/3211 362/23.08 |
| 2004/0166926 A1* | 8/2004 | Adachi | .................. | G07F 17/32 463/20 |
| 2004/0224758 A1* | 11/2004 | Okada | .................... | G07F 17/32 463/31 |
| 2005/0049046 A1* | 3/2005 | Kobayashi | .......... | G07F 17/3211 463/31 |
| 2005/0159211 A1* | 7/2005 | Englman | ................ | G07F 17/32 463/25 |
| 2006/0128467 A1* | 6/2006 | Thomas | .............. | G07F 17/3211 463/31 |
| 2007/0072668 A1* | 3/2007 | Hein | ....................... | G07F 17/32 463/16 |
| 2007/0202948 A1* | 8/2007 | Muir | .................. | G07F 17/3211 463/31 |
| 2008/0004104 A1* | 1/2008 | Durham | .............. | G07F 17/3202 463/20 |
| 2010/0291993 A1* | 11/2010 | Gagner | ........................... | 463/25 |

* cited by examiner

DEVICE AND METHOD FOR ARRANGING VIDEO DISPLAYS TO DEFINE AN OPENING TO PASS A PHYSICAL OBJECT AND DISPLAY CONTENT ABOUT THE OPENING

CROSS-REFERENCE TO RELATED APPLICATION

This application is a continuation application of co-pending U.S. application Ser. No. 13/401,346 filed Feb. 21, 2012 which is a non-provisional application of U.S. Provisional Patent Application Ser. No. 61/523,123 filed Aug. 12, 2011.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to displays, gaming devices including displays and methods where a video display is provided. More particularly it relates to such displays and methods where the display has an interior opening to provide for the operation of a mechanical device or for viewing of another display.

2. Description of the Related Art

Gaming machines have been developed having various features to capture and maintain player interest. Some features are directed to increasing or providing the player with the opportunity to win larger sums of money. For example, gaming machines may include second chance games that provide a player with additional opportunities to obtain a winning outcome. Alternatively, gaming machines may be tied into progressive gaming systems that award large progressive jackpots.

In addition to providing players with more opportunities to obtain a winning outcome or win a large sum of money, gaming machines have increased the number of features and grown in sophistication in order to increase player participation or interest in a game. For example, the mechanical reels of traditional gaming machines have been replaced with video depictions of spinning reels. These video gaming machines provide a richer gaming experience for players by including graphics or animation as part of the game. However, overly complex video displays on a gaming machine may turn off player participation because players become frustrated with the game or are unwilling to learn or decipher all the information provided on the video display. Accordingly, there is a continuing need for slot machines variants that provide a player with enhanced excitement without departing from the original slot machine gaming concept.

In relation to gaming device displays it has been known to provide video displays of game related content. Initially these displays were CRT displays; however modernly such displays are LCD displays. These displays are controlled by one or game controller(s) to display, for example, video representations of spinning reels to produce a game outcome or a bonus feature such as a game or task to be provided by a player to produce a bonus outcome.

It has been known to provide openings in a LCD display to, for example, expose another display such as a display of game reels. For example, an LCD may be placed over a secondary display for the game electro-mechanical reels. Where the LCD is a backlit LCD, via an edge lighting process, this has been done by removing portions of various substrates to create one or more openings to expose the reels such as portions of the backlight and light guide plate such that the LCD for those portions can be transparent. However, since other portions of the LCD remain intact such as polarizers, color filters, and the LCD panel, the view through the opening is cloudy, particularly when viewed at an angle to the display. This inability to provide for a clear view of the underlying display has detracted from the use of such arrangements.

As a further drawback of the prior art, cutting a whole or opening in the interior of an LCD to accommodate, for example, a mechanical pass through such as a drive shaft or for clear viewing of a second, underlying display, cannot be done without damaging the LCD.

There is a need for a video display which can overcome the drawbacks noted above.

SUMMARY OF THE INVENTION

There is set forth, according to an aspect of the present invention, a gaming device which includes a cabinet. An electronic, video, first display device is provided on the cabinet, the first display including at least two sub-displays which are mated together to define a video frame surrounding an interior opening. A second display component either extends through or is viewable through the interior opening. A controller controls the first and second displays to display selected game graphics, text, game elements and features surrounding the opening.

In one embodiment the sub-displays are L-shaped and are mated to define said opening as rectangular, circular, triangular or polygonal.

In a further embodiment the second display is a mechanical component which extends through the opening. The mechanical component may be a shaft to control the movement of, for example, a pointer, slide or other mechanical device which may cooperate with the first display to present one or more game features to the player.

In another embodiment the second display includes one or more mechanical reels configured as a second display to rotate to present an outcome and which is viewable through the opening. Inasmuch as the LCD sub-displays are not penetrated by an opening or have not had portions such as the backlight panel and light guide plate removed, the sub-displays can be controlled to display the desired video content leaving the opening clear for viewing of the mechanical reels.

In still a further embodiment the second display is a video display viewable through the opening. The second display may be flat or a curved LCD or a curved screen for display by a digital light projector (DLP) as disclosed in U.S. Published Application 2009/0258701 titled "Gaming Machine Having a Molded Curved Display" filed May 11, 2009 by Crowder et al, the disclosure of which is incorporated by reference. Again inasmuch as the LCD sub-displays are not penetrated by an opening or have not had portions such as the backlight panel and light guide plate removed, the sub-displays can be controlled to display the desired video content leaving the opening clear for viewing of the second display.

The second display may be a mechanical display or a diorama.

There is also set forth a method for displaying graphical images at a gaming device which includes securing at least two video sub-displays mated to define a video frame about an interior opening and locating the first display to cooperate with a second display component which can be a mechanical component extending through the opening or a mechanical or video component viewable through the opening. In one embodiment the method includes securing two L-shaped video sub-displays to define said video display frame surrounding a rectangular opening. The method also includes controlling the first and second displays to display game content to a player.

The displays, gaming device and methods provide a video display positioned as a frame about an opening. The opening can be used to pass a mechanical component such as a shaft for a rotatable pointer or may be used for viewing of a mechanical or video second display. The view of the second display is not distorted since the opening does not include any polarizers or LCD panel. A touch screen which is transparent may be positioned over the entire first display or only commensurate with the sub-displays.

Other features and numerous advantages of the various embodiments will become apparent from the following detailed description when viewed in conjunction with the corresponding drawings.

BRIEF DESCRIPTION OF THE DRAWINGS

These and other features and advantages will become appreciated as the same becomes better understood with reference to the specification claims and drawings wherein;

DETAILED DESCRIPTION OF THE PREFERRED EMBODIMENTS

Figure 1:
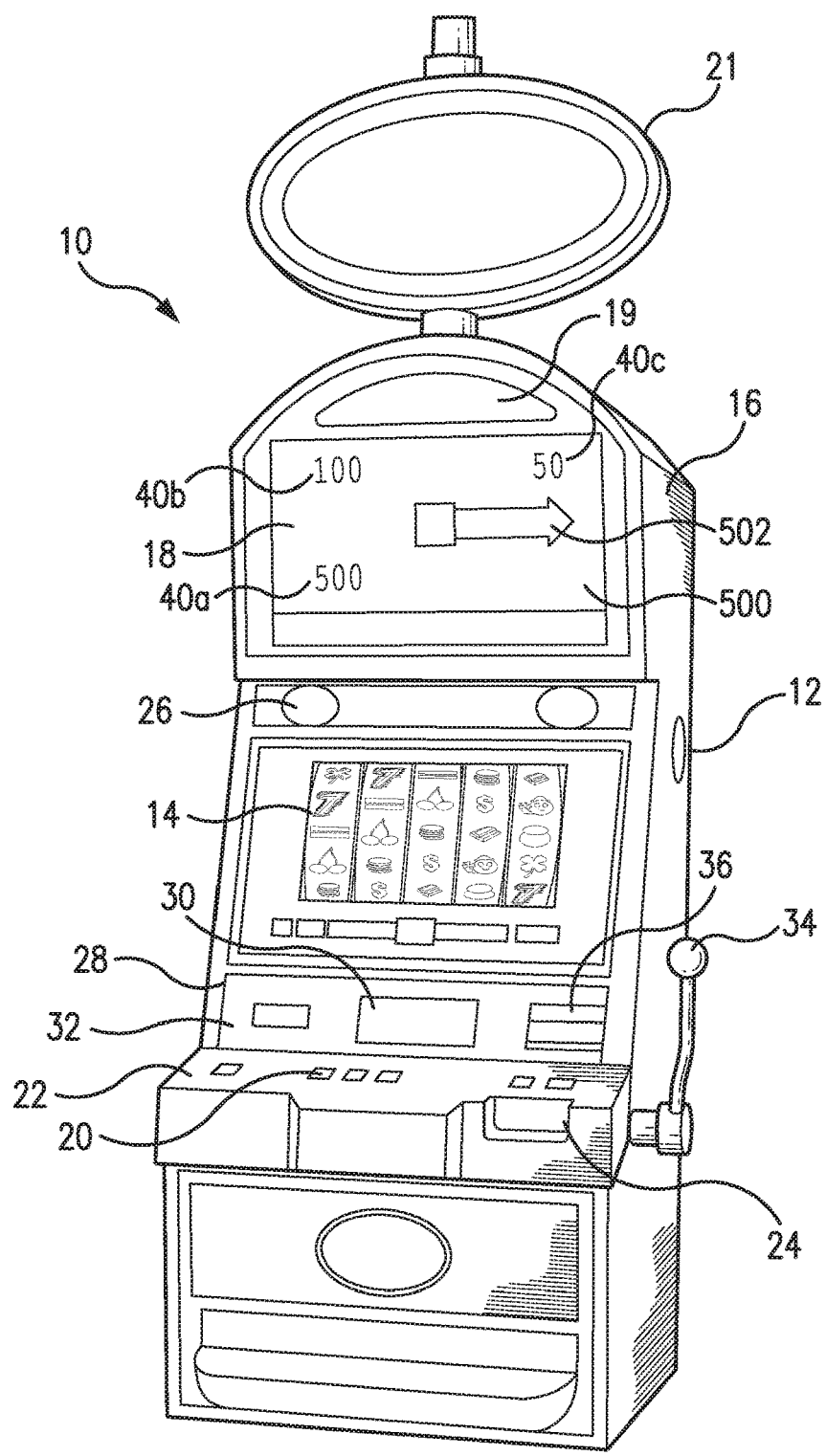
FIG. 1 illustrates a gaming device including a display and method according to one or embodiments of the present invention.

Referring now to the drawings, wherein like reference numbers denote like or corresponding elements throughout the drawings, and more particularly referring to FIG. 1, a gaming device 10 according tone or more embodiments of the present invention is shown. The gaming device 10 includes cabinet 12 providing an enclosure for the several components of the gaming device 10 and associated equipment. A primary game display 14 is mounted to the cabinet 12. The primary game display 14 may be a video display such as an LCD, plasma, OLED or other electronic display or it may be an electro-mechanical display such as electro-mechanical stepper reels as are known in the art. Still further the primary game display 14 may be the display components of the present invention as hereinafter described. The primary game display 14 may be mounted to one or more of a door for the cabinet 12 or the cabinet chassis itself. The primary game display 14 is located to display game content to the player. For example, the game content may be game outcomes presented by a plurality of video or electro-mechanical reels displaying symbols the combinations of which define winning or losing outcomes. Where the primary game display 14 is a video display, features such as bonus games may also be presented. The foregoing description should not be deemed as limiting the content (graphics, video or text) which can be displayed at the primary game display 14.

The gaming device 10 also includes in one or more embodiments a top box 16 which may support a printed back-lit glass (not shown) as is known in the art depicting the rules, award schedule, attract graphics or it may support a secondary game display 18 which may be of one of the types described above with reference to the primary game display 14. Further, and as shown in FIG. 1 the secondary game display 18 may be a display according to one or embodiments of the present invention as hereinafter described. The top box 16 may also support a backlit glass with graphics defining a marquee 19 and a topper 21 including additional graphics.

To enable a player to provide input to the controller for the gaming device 10 a plurality of buttons 20 may be provided on a button deck 22 for the gaming device 10. Additionally and alternatively one or both of the primary and secondary game displays 14, 18 may include touch screen input devices as are known in the art. Buttons, selections or inputs are displayed at the primary and secondary game displays 14, 18 and the player touching those icons or designated areas provides the required or desired input to configure and play the gaming device 10.

Other peripherals or associated equipment for the gaming device 10 include a bill/voucher acceptor 24 which reads and validates currency and vouchers for the player to establish credits for gaming on the gaming device 10 and one or more speakers 26 to provide audio to the player in association with the game play. To provide for communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality. A card reader 32 is provided to read a machine readable component on a player loyalty card issued to the player to identify the player to the casino system as in known in the art. A ticket printer 36 may be provided as well on the PTM 28 or elsewhere on the gaming device 10 to provide printed value ticket vouchers to players as is known in the art While the player may use the buttons 20 to prompt play of the game (or the touch screen input), alternatively the player may use a handle 34 to prompt an input as is known in the art.

Cabinet housing 12 may be a self-standing unit that is generally rectangular in shape and may be manufactured with reinforced steel or other rigid materials which are resistant to tampering and vandalism. Any shaped cabinet may be implemented with any embodiment of gaming machine 10 so long as it provides access to a player for playing a game. For example, cabinet 12 may comprise a slant-top, bar-top, or table-top style cabinet, including a Bally Cinevision™ or CineReels™ cabinet. The gaming device 10 may include a controller and memory disposed within the cabinet 12 or may have thin client capability such as that some of the computing capability is maintained at a remote server.

The plurality of player-activated buttons 20 may be used for various functions such as, but not limited to, selecting a wager denomination, selecting a game to be played, selecting a wager amount per game, initiating a game, or cashing out money from gaming machine 10. Buttons 20 may be operable as input mechanisms and may include mechanical buttons, electromechanical buttons or touch screen buttons. In one or more embodiments, buttons 20 may be replaced with various other input mechanisms known in the art such as, but not limited to, touch screens, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

The primary game display 14 may present a game of chance wherein a player receives one or more outcomes from a set of potential outcomes. For example, one such game of chance is a video slot machine game. In other aspects of the invention, gaming machine 10 may present a video or mechanical reel slot machine, a video keno game, a lottery game, a bingo game, a Class II bingo game, a roulette game, a craps game, a blackjack game, a mechanical or video representation of a wheel game or the like.

Figure 2A:
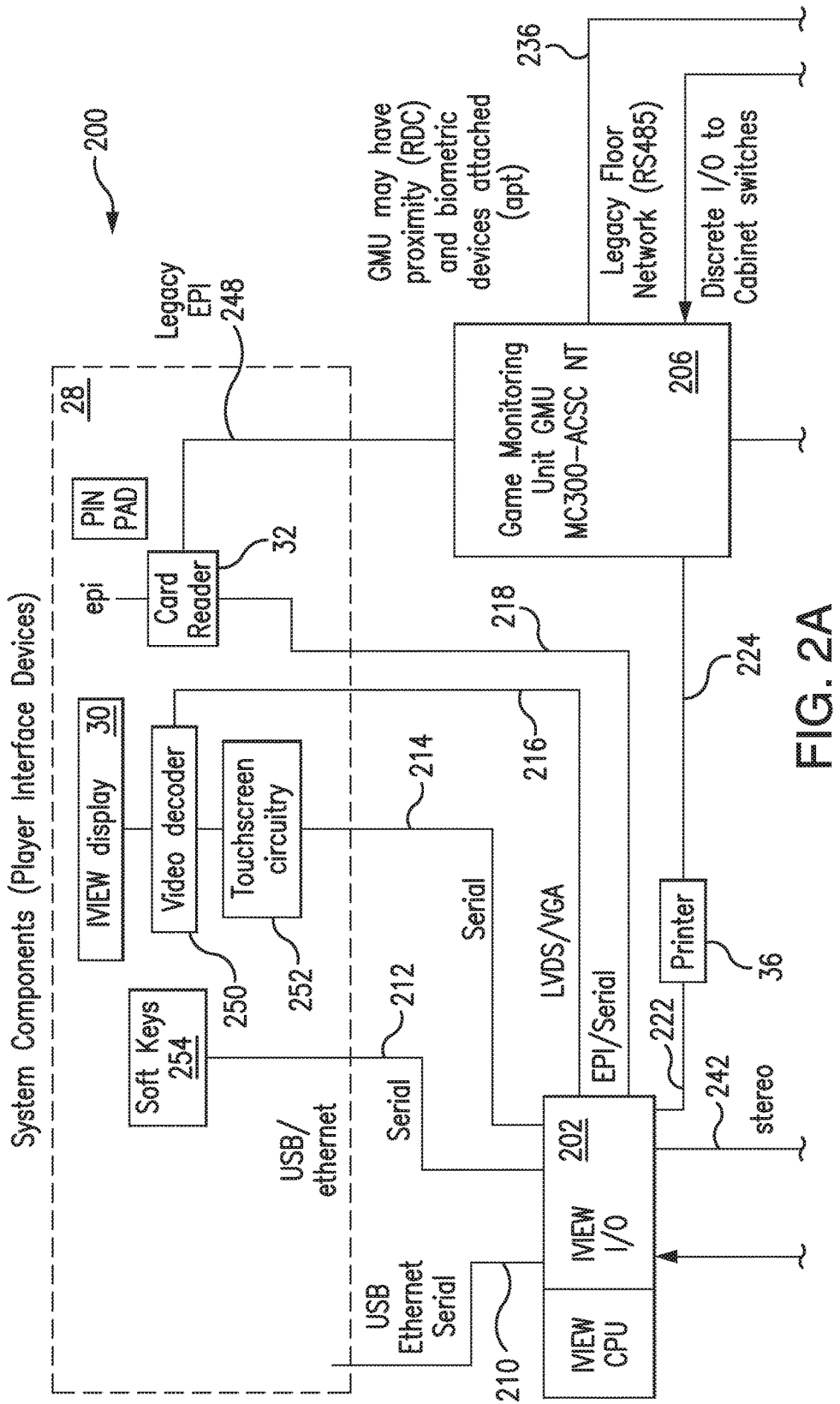
FIGS. 2A and 2B are a block diagram of the physical and logical components of the gaming machine of FIG. 1 in accordance with one or more embodiments.
Figure 2B:
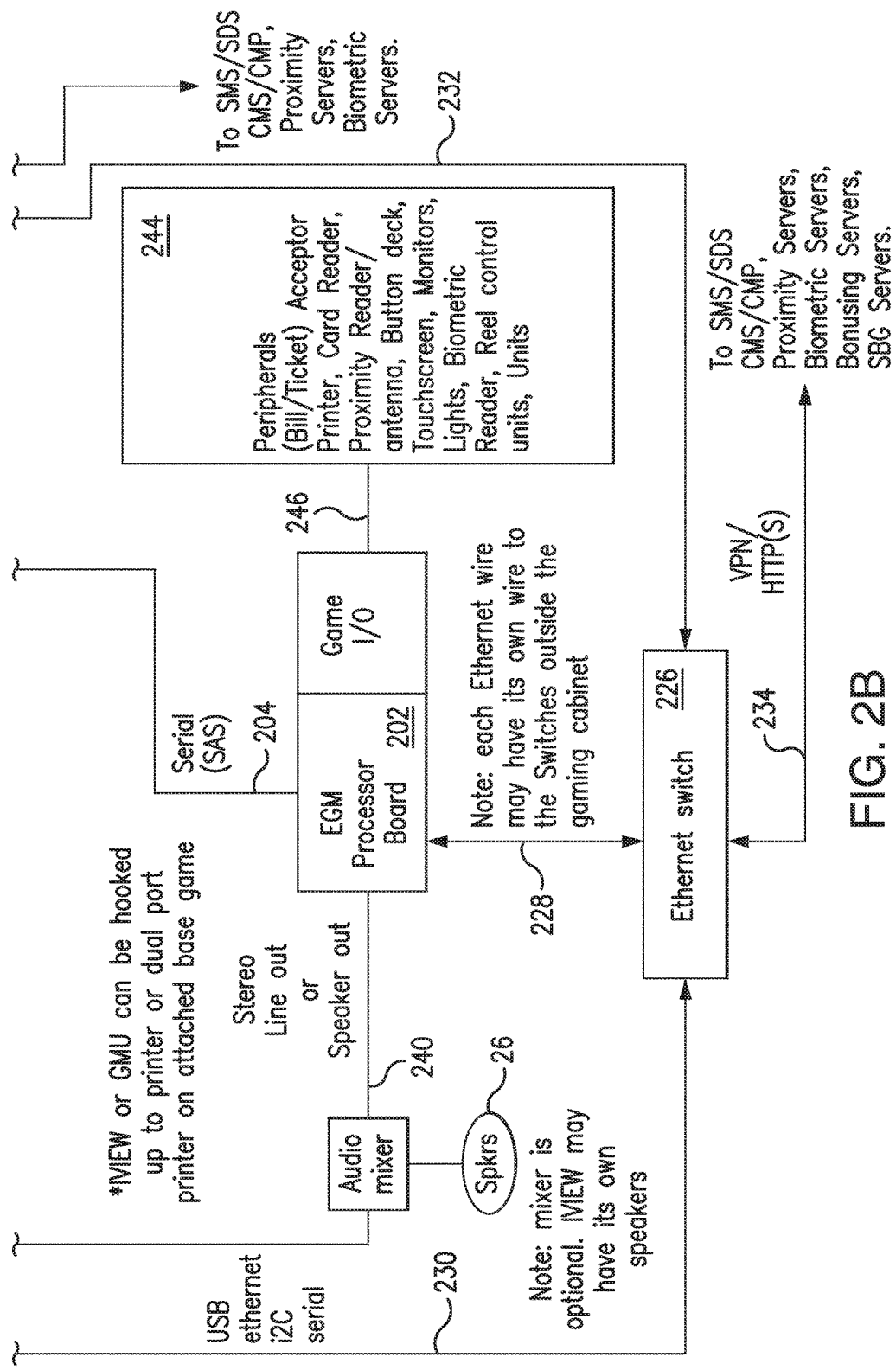

Referring to FIGS. 2A, B, the gaming device 10 hardware 200 for the controller(s) is shown in accordance with one or more embodiments. The hardware 200 includes base game integrated circuit board 202 (EGM Processor Board) connected through serial bus line 204 to game monitoring unit (GMU) 206 (such as a Bally MC300 or ACSC NT), and player interface integrated circuit board (PIB) 208 connected to the player tracking module (PTM) 28 over bus lines 210, 212, 214, 216, 218. The PTM 28 provides for communication between one or more gaming devices 10 and the casino system such as the type as hereinafter described. Inasmuch as gaming devices 10 may be manufactured by different entities, mounting like PTMs 28 at each gaming device 10 provides for communication to the system in one or more common message protocols. Gaming voucher ticket printer 36 (for printing player cash out tickets) is connected to PIB 208 and GMU 206 over bus lines 222, 224. EGM Processor Board 202, PIB 208, and GMU 206 connect to Ethernet switch 226 over bus lines 228, 230, 232. Ethernet switch 226 connects to a slot management system and a casino management system (SMS, SDS, CMS and CMP) (FIGS. 4A, B) network over bus line 234. Ethernet switch 226 may also connect to a server based gaming server or a downloadable gaming server. GMU 206 also may connect to the network over bus line 236. Speakers 26 to produce sounds related to the game or according to the present invention connect through audio mixer 238 and bus lines 240, 242 to EGM Processor Board 202 and PIB 208.

Peripherals 244 connect through bus 246 to EGM Processor Board 202. The peripherals 244 include, but are not limited to the following and may include individual processing capability: bill/voucher acceptor 24 to validate and accept currency and ticket vouchers, the player interfaces such a buttons 20, primary and secondary game displays 14, 18 and any secondary or tertiary displays (with/without) touch screen functionality, monitors and lights. The peripherals 244 may include the displays as hereinafter described with reference to the various embodiments of the present invention as herein described or their equivalents. For example, the bill/voucher acceptor 24 is typically connected to the game input-output board of the EGM processing board 202 (which is, in turn, connected to a conventional central processing unit ("CPU") board), such as an Intel Pentium® microprocessor mounted on a gaming motherboard. The I/O board may be connected to CPU processor board by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 202 executes a game program that causes the gaming terminal 10 to display and play a game. The various components and included devices may be installed with conventionally and/or commercially available components, devices, and circuitry into a conventional and/or commercially available gaming terminal cabinet 12.

When a player has inserted a form of currency such as, for example and without limitation, paper currency, coins or tokens, cashless tickets or vouchers, electronic funds transfers or the like into the currency acceptor, a signal is sent by way of bus 246 to the I/O board and to EGM processor board 202 which, in turn, assigns an appropriate number of credits for play in accordance with the game program. The player may further control the operation of the gaming machine by way of other peripherals 244, for example, to select the amount to wager via the buttons 20. The game starts in response to the player operating a start mechanism such as the handle 34, button 20 such as a SPIN/RESET button or a touch screen icon. The game program includes a random number generator to provide a display of randomly selected indicia on one or more displays such as the primary game display 14 as shown in FIG. 1. In some embodiments, the random generator may be physically separate from gaming terminal 10; for example, it may be part of a central determination host system which provides random game outcomes to the game program. Finally, EGM processor board 202 under control of the game program and OS compares the outcome to an award schedule. The set of possible game outcomes may include a subset of outcomes related to the triggering and play of a feature or bonus game. In the event the displayed outcome is a member of this subset, EGM processor board 202, under control of the game program and by way of I/O Board 202, may cause feature game play to be presented on the primary game display 14 and/or any secondary display(s) 18.

Predetermined payout amounts for certain outcomes, including feature game outcomes, are stored as part of the game program. Such payout amounts are, in response to instructions from processor board 202, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In an embodiment, the remote storage device is housed in a remote server such as a downloadable gaming server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming terminal are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 206 includes an integrated circuit board and GMU processor and memory including coding for network communications, such as the G2S (game-to-system) protocol from the Gaming Standards Association, Las Vegas, Nev., used for system communications over the network. As shown, GMU 206 may connect to the card reader 32 through bus 248 and may thereby obtain player information and transmit the information over the network through bus 236. Gaming activity information may be transferred by the EGM Processor Board 202 to GMU 206 where the information may be translated into a network protocol, such as S2S, for transmission to a server, such as a player tracking server, where information about a player's playing activity may be stored in a designated server database.

PID 208 includes an integrated circuit board, PID processor, and memory which includes an operating system, such as Windows CE, a player interface program which may be executable by the PID 208 processor together with various input/output (I/O) drivers for respective devices which connect to PID 208, such as player tracking module 28, and which may further include various games or game components playable on PID 208 or playable on a connected network server and PID 208 is operable as the player interface. PID 208 connects to card reader 24 through bus 218, player tracking display 30 through video decoder 250 and bus 216, such as an LVDS or VGA bus.

As part of its programming, the PID 208 processor executes coding to drive player tracking display 30 and provide messages and information to a player. Touch screen circuitry 252 interactively connects display 30 and video decoder 250 to PID 208 such that a player may input information and cause the information to be transmitted to PID 208 either on the player's initiative or responsive to a query by PID 208. Additionally soft keys 254 connect through bus 212 to PID 208 and operate together with the player tracking display 30 to provide information or queries to a player and receive responses or queries from the player. PD 208, in turn, communicates over the CMS/SMS network through Ethernet switch 226 and busses 230, 234 and with respective servers, such as a player tracking server.

PTMs 28 are linked into the virtual private network of the system components in gaming terminal 10. The system components include the player tacking module 28 (e.g. Bally iVIEW® device) ("iView" is a registered trademark of Bally Gaming, Inc.) processing board 202 and game monitoring unit (GMU) processing board 206. These system components may connect over a network to the slot management system (such as a commercially available Bally SDS/SMS) and/or casino management system (such as a commercially available Bally CMP/CMS).

The GMU 206 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the PTM 28 processing board and game monitoring unit (GMU) 206. The GMU 206 and PTM 28 can be combined into one like the commercially available Bally GTM iVIEW device. This device may have a video mixing technology to mix the EGM processor's video signals with the iVIEW display onto the top box monitor or any monitor on the gaming device.

Figure 3:
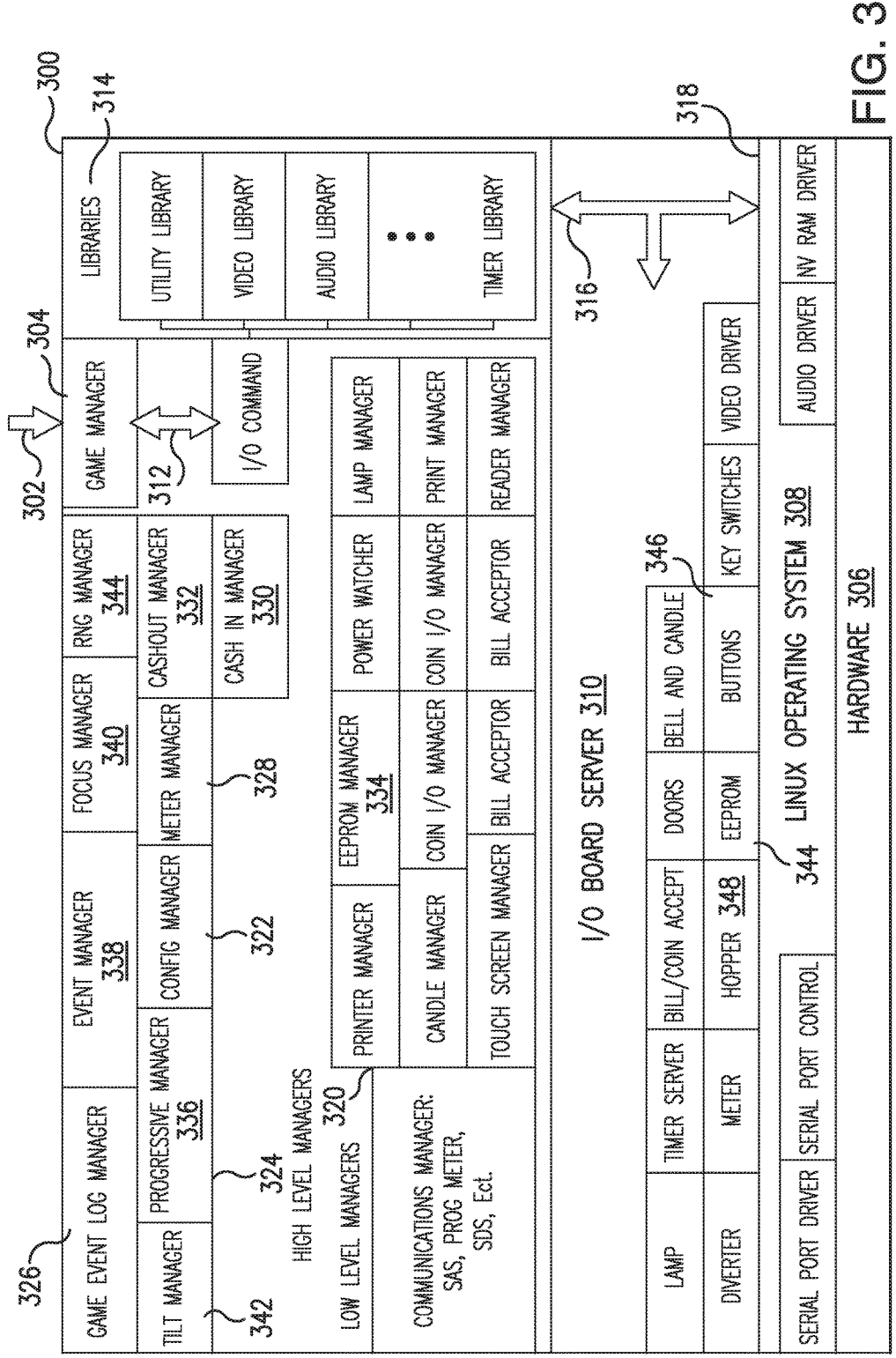
FIG. 3 is a block diagram of the logical components of a gaming kernel in accordance with one or more embodiments.

In accordance with one or more embodiments, FIG. 3 is a functional block diagram of a gaming kernel 300 of a game program under control of gaming terminal processor board 202. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 306; an operating system layer 308, such as, but not limited to, Linux; and a game kernel layer 300 having game manager 304 therein. In one or more embodiments, the use of an operating system layer 308, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 300 executes at the user level of the operating system layer 308, and itself contains a major component called the I/O board server 310. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 316). A few specific drivers remain in operating system layer 308's kernel, shown as those below line 318. These are built-in, primitive, or privileged drivers that are (i) general (ii) kept to a minimum and (iii) are easier to leave than extract. In such cases, the low-level communications is handled within operating system layer 308 and the contents passed to library routines 314.

Thus, in a few cases library routines may interact with drivers inside operating system layer 308, which is why arrow 316 is shown as having three directions (between library routines 314 and I/O board server 310, or between library routines 314 and certain drivers in operating system layer 308). No matter which path is taken, the logic needed to work with each device is coded into modules in the user layer of the diagram. Operating system layer 310 is kept as simple, stripped down, and common across as many hardware platforms as possible. The library utilities and user-level drivers change as dictated by the game cabinet or game machine in which it will run. Thus, each game cabinet or game machine may have an industry standard EGM processing board 202 connected to a unique, relatively dumb, and as inexpensive as possible I/O adapter board, plus a gaming kernel 300 which will have the game-machine-unique library routines and I/O board server 310 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 320, although lower level managers 320 may be accessible through game manager 304's interface 302 if a programmer has the need. In addition to the freedom derived from not having to deal with the hardware level drivers and the freedom of having consistent, callable, object-oriented interfaces to software managers of those components (drivers), game manager 304 provides access to a set of upper level managers 320 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 322 is among the first objects to be started; configuration manager 322 has data needed to initialize and correctly configure other objects or servers.

The high level managers 324 of game kernel 300 may include game event log manager 326 which provides, at the least, a logging or logger base class, enabling other logging objects to be derived from this base object. The logger object is a generic logger; that is, it is not aware of the contents of logged messages and events. The game event log manager's 326 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 328 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 328 receives its initialization data for the meters, during start-up, from configuration manager 322. While running, the cash in manager 330 and cash out manager 332 call the meter manager's 328 update functions to update the meters. Meter manager 328 will, on occasion, create backup copies of the soft meters by storing the soft meters' readings in EEPROM. This is accomplished by calling and using EEPROM manager 334.

In accordance with still other embodiments, progressive manager 336 manages progressive games playable from the game machine. Event manager 338 is generic, like game event log manager 326, and is used to manage various gaming machine events. Focus manager 340 correlates which process has control of various focus items. Tilt manager 342 is an object that receives a list of errors (if any) from configuration manager 322 at initialization, and during game play from processes, managers, drivers, etc. that may generate errors. Random number generator manager 344 is provided to allow easy programming access to a random number generator (RNG), as a RNG is required in virtually all casino-style (gambling) games. Random number generator manager 344 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 332 has the responsibility of configuring and managing monetary output devices. During initialization, cash out manager 332, using data from configuration manager 322, sets the cash out devices correctly and selects any selectable cash out denominations. During play, a game application may post a cash out event through the event manager 338 (the same way all events are handled), and using a call back posted by cash out manager 332, cash out manager 332 is informed of the event. Cash out manager 332 updates the credit object, updates its state in non-volatile memory, and sends an appropriate control message to the device manager that corresponds to the dispensing device. As the device dispenses dispensable media, there will typically be event messages being sent back and forth between the device and cash out manager 332 until the dispensing finishes, after which cash out manager 332, having updated the credit manager and any other game state (such as some associated with meter manager 328) that needs to be updated for this set of actions, sends a cash out completion event to event manager 338 and to the game application thereby. Cash in manager 330 functions similarly to cash out manager 332, only controlling, interfacing with, and taking care of actions associated with cashing in events, cash in devices, and associated meters and crediting.

In a further example, in accordance with one or more embodiments, I/O board server 310 may write data to the gaming machine EEPROM memory, which is located in the gaming machine cabinet and holds meter storage that must be kept even in the event of power failure. Game manager 304 calls the I/O library functions to write data to the EEPROM. The I/O board server 310 receives the request and starts a low priority EEPROM thread 344 within I/O board server 310 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 346 within I/O board server 310, polls (or is sent) the state of buttons every 2 ms. These inputs are debounced by keeping a history of input samples. Certain sequences of samples are required to detect a button was pressed, in which case the I/O board server 310 sends an inter-process communication event to game manager 304 that a button was pressed or released. In some embodiments, the gaming machine may have intelligent distributed I/O which debounces the buttons, in which case button module 346 may be able to communicate with the remote intelligent button processor to get the button events and simply relay them to game manager 304 via IPC messages. In still another embodiment, the I/O library may be used for pay out requests from the game application. For example, hopper module 348 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

Figure 4A:
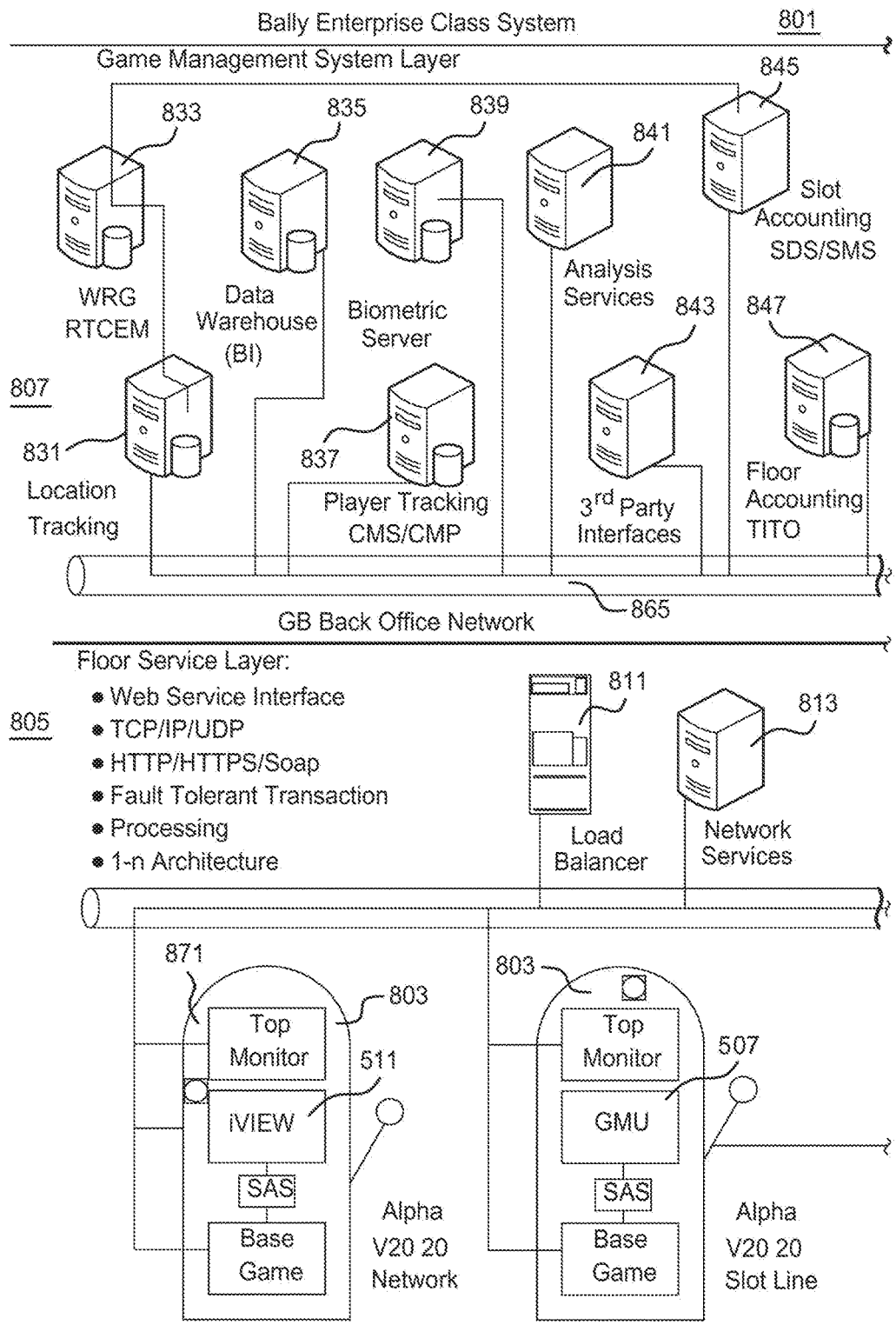
FIGS. 4A and 4B is a schematic block diagram showing the hardware elements of a networked gaming system in accordance with one or more embodiments.
Figure 4B:
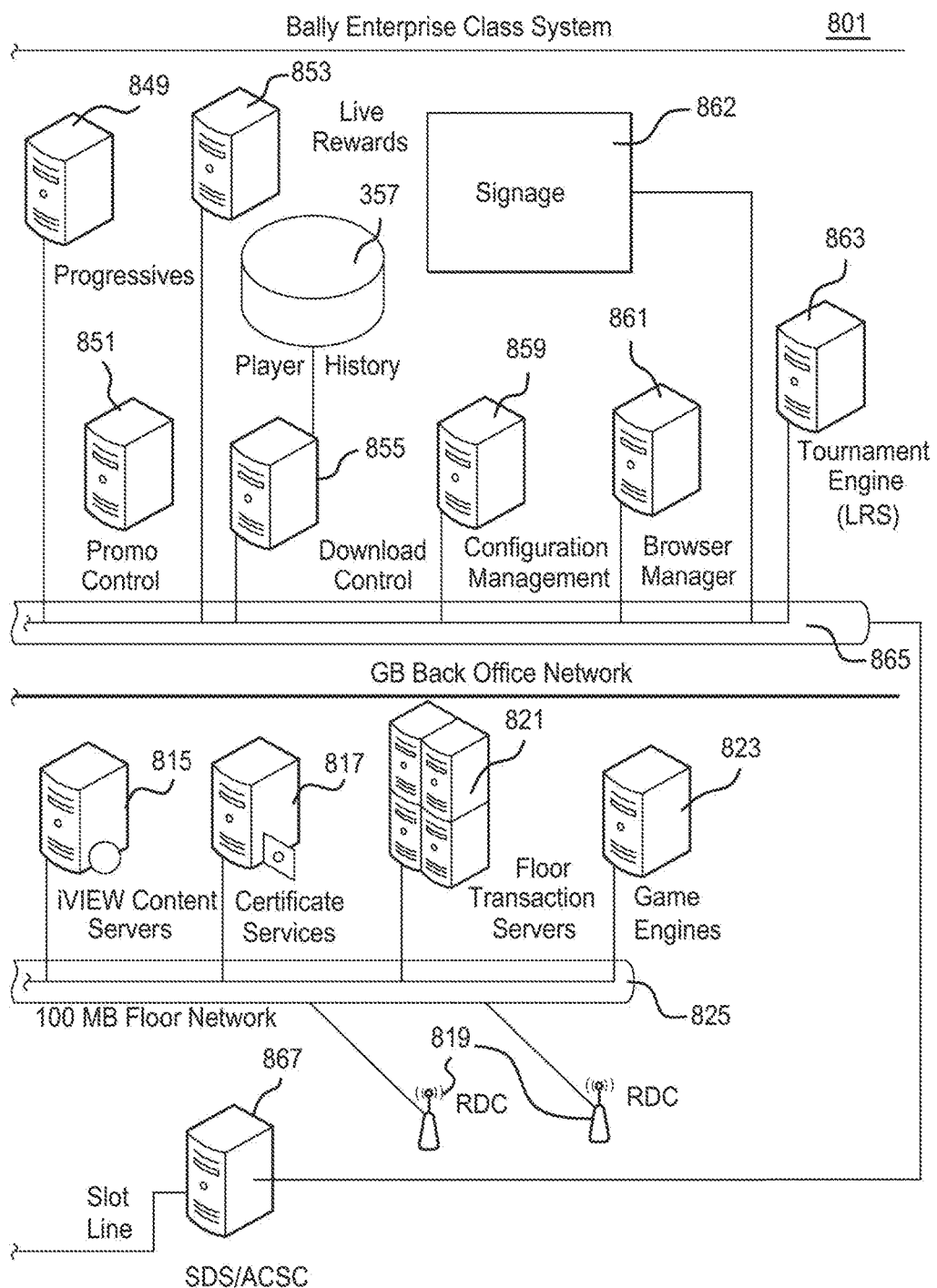

Referring to FIGS. 4A and B, a gaming system 801 is shown in accordance with one or more embodiments. Gaming system 801 may include one casino or multiple locations and generally includes a network of gaming terminals 803 (such as a gaming terminals 10 of the type as described in FIG. 1), floor management system (SMS) 805, and casino management system (CMS) 807. SMS 805 may include load balancer 811, network services server 813, player tracking module 28, iView (PTM 28) content servers 815, certificate services server 817, floor radio dispatch receiver/transmitters (RDC) 819, floor transaction servers 821 and game engines 823 (where the gaming terminals 803 operate server based or downloadable games), each of which may connect over network bus 825 to gaming terminals 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming terminals 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming terminals 803 include various peripheral components that may be connected with USB, serial, parallel, RS-485 or Ethernet devices/architectures to the system components within the respective gaming machine. The GMU 507 has a connection to the base game through a serial SAS connection. The system components in the gaming cabinet may be connected to the servers using HTTPs or G2S over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming devices 803 are authenticated using conventional techniques prior to install on the system components.

In various embodiments, any of the gaming terminals 803 may be a mechanical reel spinning slot machine, video slot machine, video poker machine, video bingo machine, keno machine, or a gaming device offering one or more of the above described games including an interactive wheel feature. Alternately, gaming terminals 803 may provide a game with an accumulation-style feature game as one of a set of multiple primary games selected for play by a random number generator, as described above. A gaming system 801 of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Published Application 2008/0139305, entitled "Networked System and Method for Group Gaming," filed on Nov. 9, 2007, which is hereby incorporated by reference in its entirety for all purposes.

The gaming system 801, among other functionalities such as slot accounting (i.e. monitoring the amount wagered ("drop"), awards paid) and other casino services, includes the player tracking CMS/CMP server 837 and/or data warehouse 835 storing player account data. This data includes personal data for players enrolled in the casino players club sometimes referred to as a loyalty club. An example of the personal data is the player's name, address, SSN, birth date, spouse's name and perhaps personal preferences such as types of games, preferences regarding promotions and the like. As is known in the industry and according to the prior art, at enrollment the player is assigned a created account in the player tracking CMS/CMP server 837 and is issued a player tracking card having a machine readable magnetic stripe.

When a player plays a gaming terminal 10, he/she inserts their player tracking card into the card reader 32 (FIG. 1)

which communicates data to the CMS/CMP server 837 to accumulate loyalty points based upon the wagers/wins of the player. For example, a player may accumulate one loyalty point for each $5 wagered.

The system 801 may also include electronic transfer of funds functionality. For example, a player having accumulated $100 at a gaming terminal 100 may decide to "cash out" to play another gaming terminal. The player, for example using the PTM 28 to initiate communication with the system 801 for example server 837 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt provides for the player to request funds from their account. Entering their PIN (or biometric identifier) the player can input the desired amount which is downloaded to their gaming terminal 100 for play.

Turning to FIGS. 5-10 embodiments of the gaming terminal, displays and methods of the present invention are described. In one embodiment as shown in FIGS. 5-8 the display 500 is configured to accommodate a component viewable through an opening shown as a mechanical, rotatable pointer 502. The display 500 includes electronic, video, sub-displays 504a, b which may be LCD, plasma, OLED or other electronic video display. As shown each sub-display 504a, b may have an L-shape. The L-shape of the sub-displays 504a, b enables the LCD panel to be controlled inasmuch as the matrix of thin film transistor (TFT) switching devices and controls therefore remains intact. That is, an attempt to bore or cut an interior opening in an LCD would disturb the matrix. For example, in U.S. Pat. No. 7,961,166 issued Jun. 14, 2011 and titled "Liquid Crystal Display Device Driving Apparatus Thereof and Driving Method Thereof", the disclosure of which is incorporated by reference, discloses an LCD having a matrix of cells controlled by an m×n matrix of data and gate lines. Cutting or boring a hole through the interior of the LCD would disturb the matrix and prevent control of at least a portion of the matrix and LCD. By fashioning the sub-panels 504a, b to be continuous the matrix remains undisturbed and the cells of the LCD panel can be controlled for operation of the LCD. Each LCD panel 504a, b includes cold cathode fluorescent lighting 506 such as edge lighting as shown.

Figure 5:
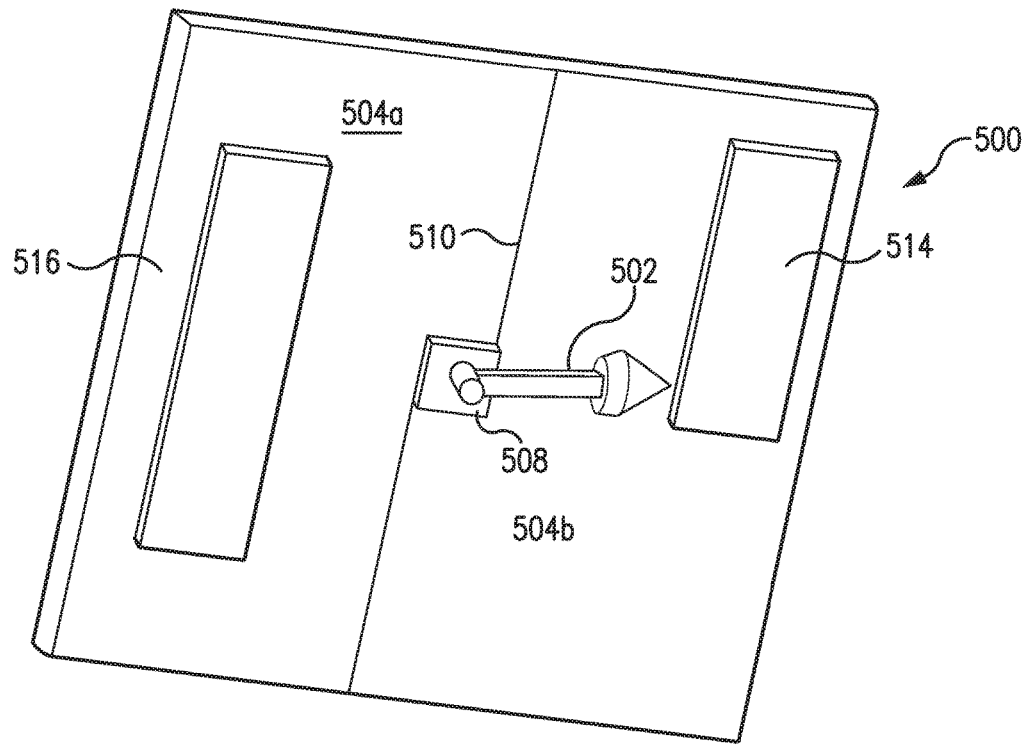
FIG. 5 is a front view of the first and second displays according to an embodiment of the present invention.

The sub-panels 504a, b are mated together as shown in FIG. 5 to define the rectangular LCD video display 500 frame surrounding an interior opening 508. By configuring the dimensions of the L-shaped margins 510 of the sub-panels 504a, b, the shape and dimensions of the opening 508 can be as desired. In the embodiment shown in FIG. 5 the opening 508 is sized to accommodate a second display element shown as the pointer 502 and more particularly it accommodates the driving shaft 512 which extends though the display 500 to mount the pointer 502 for controlled rotation of the pointer 502 as hereinafter described. The opening 508 may accommodate other aspects of the second display such as a driver for a mechanical slider, wheel or other mechanical device.

To control the images displayed on the display 500 one or more controllers 514 may be provided and may be mounted to the backside of one or both of the sub-displays 504a, b. One or more power supply units 516 may also be mounted to the backside of one or more of the sub-displays 504a, b. It should be understood that the controller(s) 514 and power supply(ies) could also be mounted elsewhere and connected to the sub-panels 504a, b in a known fashion. The controller(s) 514 may be coupled to the EGM processor Board 202 for control of the sub-displays 504a, b in coordination to the game functionality. While not shown, the shaft 512 is connected to a driving motor which is likewise preferably controlled by the EGM processor Board 202.

Figure 6:
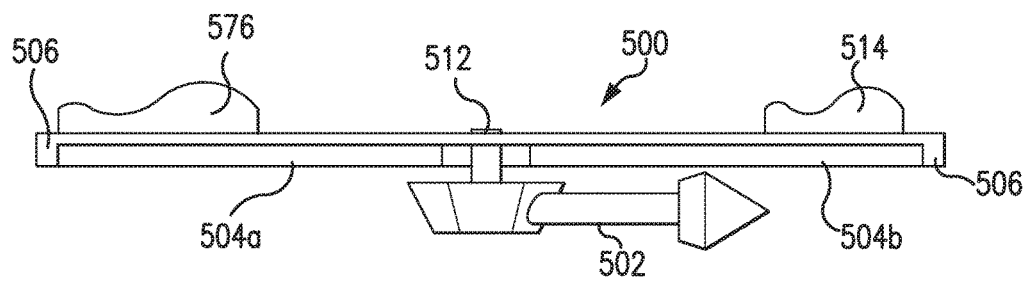
FIG. 6 is a side view of the first and second displays of FIG. 5, FIGS. 7A-C are front views and a perspective cutaway view of the first and second displays of FIG. 5.
Figure 7A:
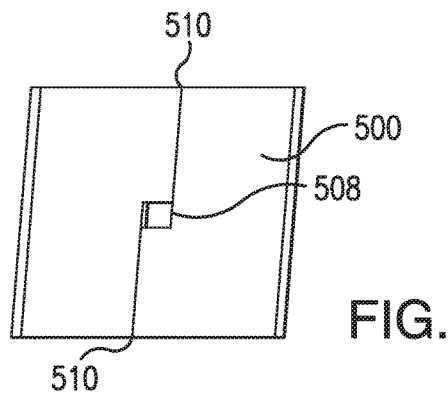
Figure 7B:
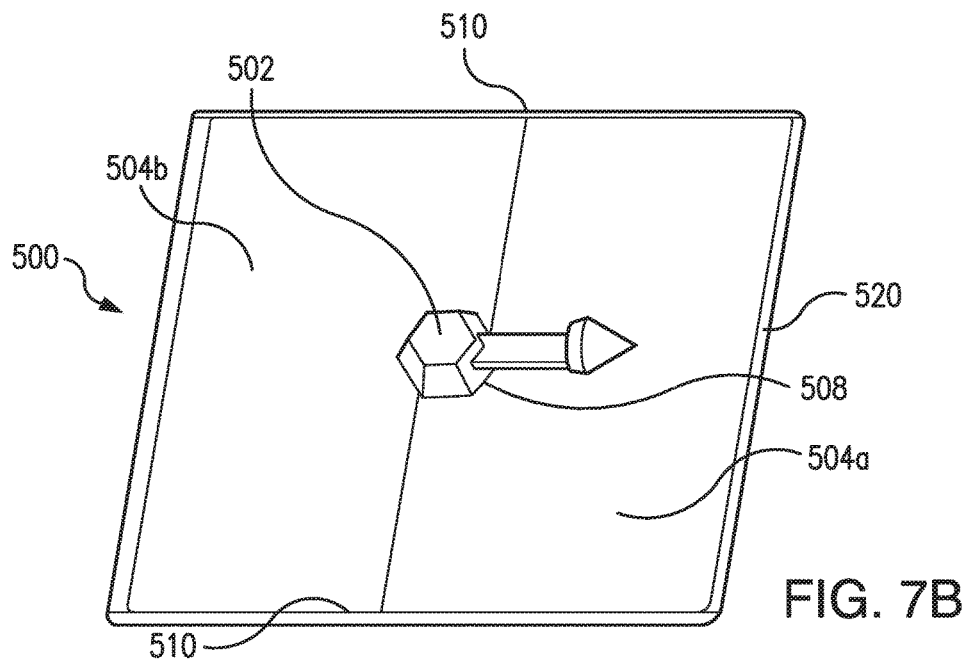
Figure 7C:
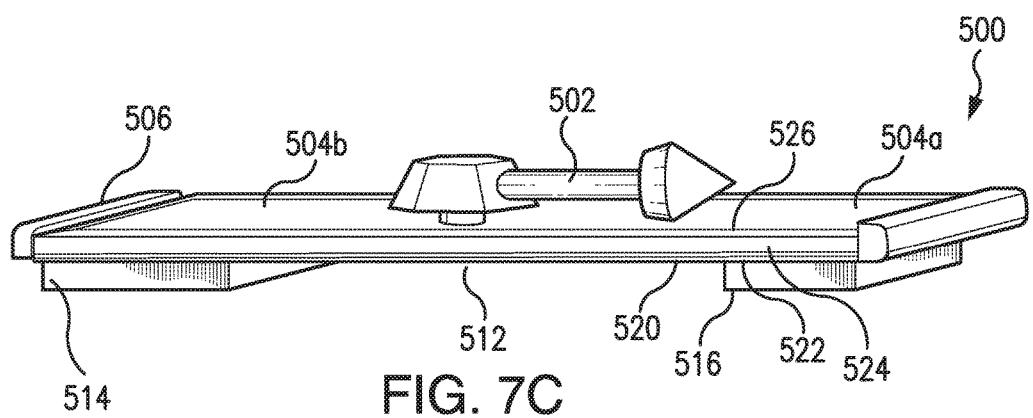

FIGS. 7A-7C show other views of the display 500 of FIGS. 5-6. In FIGS. 7B, C there is a shown a supporting structure 520 which may be metal which supports the various panels for the sub-displays 504a, b. The structure 520 surrounds the perimeter of each sub-display 504a, b. With reference to FIG. 7C each sub-display 504a, b includes a reflector panel 522, light guide 524 and LCD panel 526 (matrix of thin film transistor (TFT) switching devices and controls). FIG. 7A shows the assembled first display 500 defining the frame surrounding the interior opening 508.

The display sub-displays 504a, b include sandwiched L-shaped panels including the reflector 520, light guide 524 and LCD panel 526, diffusers, polarisers and LCD panel. The supporting structures of the 520 L-shaped panels 504a, b when mated together to define the display 500 may create, at the mated margins, 510 bands or lines which may be visible to the player. These lines may be masked by other means such as masking overlays or the like. In an alternative embodiment certain panels of the display 500 may be the same size as the overall display 500 with interior openings with the LCD panel and polarisers being L-shaped.

Returning to FIGS. 1 and 5, the display 500 may be mounted to define the secondary game display 18 for the gaming device 10. As but an example of the operation of the display 500, the player may obtain an outcome at the primary game display entitling the player to a feature game played at the secondary game display 18. The display 500 is controlled to display images such as a space scene with several values 40a-c displayed as well. The player is prompted to activate the second display which controls the pointer 502 to rotate and eventually point to an award to the player. Since the display 500 has the interior opening 508 to accommodate the second display mechanical pointer 502, the entertainment value for the feature game is enhanced. Since LCDs are destroyed by a penetration required by the shaft 512 of the pointer 502, the present invention enables the game designers to create such features.

Figure 8:
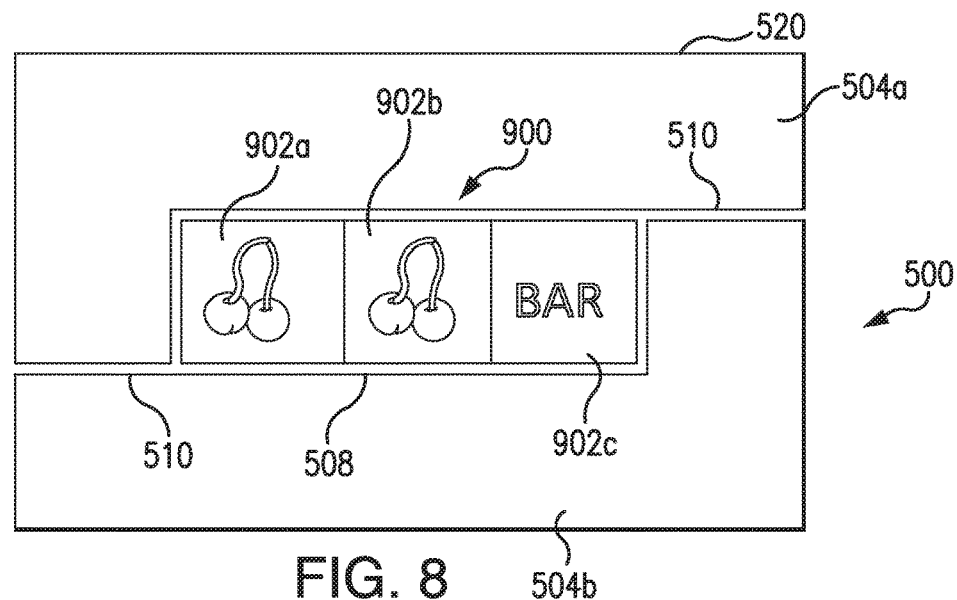
FIG. 8 is a front view of the first and second displays according to another embodiment of the present invention.

Turning to FIG. 8 a further embodiment of the invention is illustrated. In this embodiment the display 500 is configured to have sub-displays 504a, b defining a video frame surrounding an opening 508 through which a second display 900 can be viewed. In this embodiment the second display 800 is one or more electro-mechanical of video reels shown as three reels 802a-c. It should be understood that the opening 508 and second display 900 may be configured to display, for example, three reels 902a-c. For example, the second display 900 may be a separate video, LCD, OLED, plasma or other video display displaying three to five reels as well as other game features or it may be a number of electro-mechanical stepper reels. The reels 902a-c, as is well known, display game symbols for the play of the game and game outcomes defined by those symbols or combinations thereof. In another embodiment the second display 900 may be a video display of a Keno, Poker, Bingo, Blackjack or other game. The display 500 may display messages and graphics associated and/or in coordination with the game played on the second display 900, advertising messages, game information such as meters (credits available, credits bet, credits won), number of pay lines wagered upon, amount wagered per pay line and the like. The display 500 may also display system related messages to the player such as the status of the player's account and the like.

Since the opening 508 does not require the player to look through diffusers, polarisers or the LCD panel as is the case according to the prior art, the view of the second display 900 is not blurred, darkened, obscured or subject to viewing angle distortion.

To provide touch screen input functionality a touch screen may be provided over the entire area of the display 500 (and second display 900) or over a portion of the displays. Since the touch screen is transparent it would not affect the view of the first and second displays 500, 800.

Figure 9:
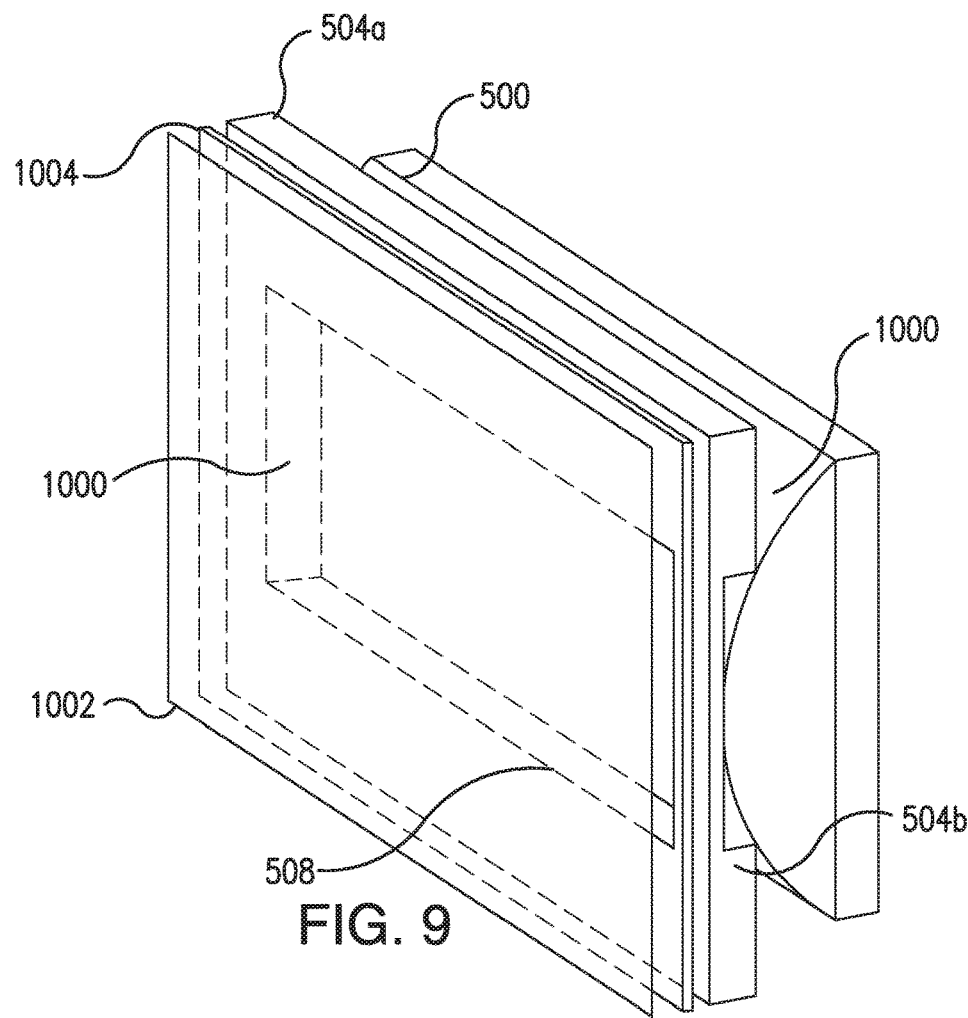
FIG. 9 is a side, perspective assembly view for the first and second displays according to another embodiment of the present invention.

FIG. 9 shows yet another embodiment of the present invention. According to this embodiment the first display 500 is configured to have L-shaped sub-displays 504*a, b* as described above configured to define an interior opening 508 through which the player can view a curved second display 1000. The curved display 1000 may be a curved LCD display or a curved screen for a digital light projector (DLP) as disclosed in U.S. Patent Application 2009/0258701 the disclosure of which has been incorporated by reference. A touch screen 1002 is provided over the entire first and second displays 500, 1000. The touch screen 1002 enables the player to interact with the game controller (e.g. EGM processor Board 202) and/or the system through the PID 208 for the PTM 28. Graphics glass 1004 may be disposed between the sub-displays 504*a, b* and the touch screen 1002.

The sub-displays 504*a, b*, as stated above, may be L-shaped, rectangular, triangular or any other shape which maintains the display control functionality of the display 500 while still providing for the opening 508. To mask the seam margins 510 between the mated sub-displays 504*a, b* the touch screen 1002 overlay may have masking material disposed to mask the aforesaid seam.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A device including a video display having a rectangular opening there through for passing a physical object comprising:
    a housing to mount the video display;
    the video display including two L-shaped sub-displays configured to be coupled together to cooperatively define the video display having the rectangular opening there through, each sub-display including a m×n matrix of transistor switching devices, the rectangular opening providing for the passing of the physical object though the video display; and
    a controller to control the video display to display text or graphics.

2. The device of claim 1 comprising the controller is configured to control the video display to display graphics associated with the physical object.

3. The device of claim 1 comprising the physical object is a moveable physical component.

4. The device of claim 3 comprising the physical component is a rotatable component controlled for rotation.

5. The gaming device of claim 1 comprising the video display includes a touch screen for receiving input to the controller.

6. A device comprising:
    a housing to mount a video display including first and second adjoining L-shaped video sub-display elements arranged to define the video display about an interior opening for the passing of a physical object though the defined video display; and
    a controller to control the video sub-display elements to display text or graphics about the interior opening.

7. The device of claim 6 comprising the first and second L-shaped video sub-display elements are LCD displays.

8. The device of claim 7 comprising the housing mounting the first and second L-shaped LCD video sub-display elements in a mated arrangement to define a substantially continuous video display about the interior opening for the passing of a physical object though the video display, each L-shaped LCD video sub-display element including a matrix of switches and a connector to place the matrices of switches in communication with the controller to control the L-shaped LCD video sub-display elements to display text and graphics.

9. The device of claim 6 comprising a touch input associated with the first and second video L-shaped sub-display elements for receiving input to the controller.

10. The device of claim 6 comprising the physical object is a mechanical component moveably controlled by said controller though said interior opening.

11. A method for displaying text or graphical images associated with a physical object comprising;
    securing a pair of L-shaped video sub-display elements in a mated arrangement on a housing to define a video display having an interior opening there through;
    arranging for a physical object to pass through the interior opening; and
    controlling with a controller said video display to display the text or graphical images associated with the physical object about the interior opening.

12. The method of claim 11 comprising the pair of L-shaped video sub-display elements are L-shaped LCD video sub-display elements.

* * * * *